US009744904B1

(12) United States Patent
Tolliver

(10) Patent No.: US 9,744,904 B1
(45) Date of Patent: Aug. 29, 2017

(54) VEHICLE ALARM

(71) Applicant: Corinne Tolliver, Bronx, NY (US)

(72) Inventor: Corinne Tolliver, Bronx, NY (US)

(*) Notice: Subject to any disclaimer, the term of this patent is extended or adjusted under 35 U.S.C. 154(b) by 0 days.

(21) Appl. No.: 15/019,503

(22) Filed: Feb. 9, 2016

(51) Int. Cl.
B60R 25/10 (2013.01)
B60Q 9/00 (2006.01)
H04W 4/22 (2009.01)
H04W 4/14 (2009.01)
G01S 19/17 (2010.01)

(52) U.S. Cl.
CPC .............. B60Q 9/00 (2013.01); G01S 19/17 (2013.01); H04W 4/14 (2013.01); H04W 4/22 (2013.01)

(58) Field of Classification Search
CPC .. G07C 5/008; G07C 5/0891; G07C 9/00904; G07C 9/00166; G08G 1/205; G08G 1/04; G08G 1/081; C08L 67/03; C08L 2666/18; C08L 67/06; G02B 5/3083; G02B 1/04; G02B 1/105; G02B 27/281; G02B 5/3025
USPC ....... 340/426.1, 428–429, 435–436, 426.16, 340/426.19, 426.22, 426.36, 426.34, 340/426.35, 439, 441, 572.1–572.9
See application file for complete search history.

(56) References Cited

U.S. PATENT DOCUMENTS

| 5,374,164 | A | 12/1994 | Schulz | |
|---|---|---|---|---|
| 5,543,776 | A | 8/1996 | L'Esperance | |
| 5,781,872 | A * | 7/1998 | Konishi | B60K 35/00 340/438 |
| 5,955,981 | A | 9/1999 | Rangan | |
| D448,157 | S | 9/2001 | Wright | |
| 7,667,619 | B2 * | 2/2010 | Montgomery, Sr. ... | G07B 15/02 340/932 |
| 7,961,095 | B2 * | 6/2011 | George | G08B 25/009 340/539.1 |
| 2003/0231131 | A1 | 12/2003 | Dimig | |
| 2006/0095199 | A1 * | 5/2006 | Lagassey | G07C 5/008 701/117 |
| 2009/0322535 | A1 * | 12/2009 | Shin | B60R 25/1012 340/572.1 |
| 2010/0271231 | A1 * | 10/2010 | Gottlieb | G08C 17/00 340/4.3 |
| 2012/0140080 | A1 * | 6/2012 | Taylor | B60C 23/0408 348/148 |

FOREIGN PATENT DOCUMENTS

DE 19607017 A1 6/2000
WO 2006015746 A2 2/2006

* cited by examiner

Primary Examiner — Daniel Previl

(57) ABSTRACT

The vehicle alarm communication module is a communication device that is adapted to work with and be integrated into vehicle alarm system. The vehicle alarm communication module incorporates text-messaging capability into vehicle alarm system. The vehicle alarm communication module is able to text changes in a location of the vehicle to a video receiver box that can be accessed through a television to allow users to see the location of their car. In addition, the vehicle alarm communication module provides text to 911 capability, which allows the user to send a text message to participating emergency services organizations containing a distress message and the GPS location of the vehicle. The vehicle alarm communication module comprises a control box, a key fob, and a station box.

10 Claims, 4 Drawing Sheets

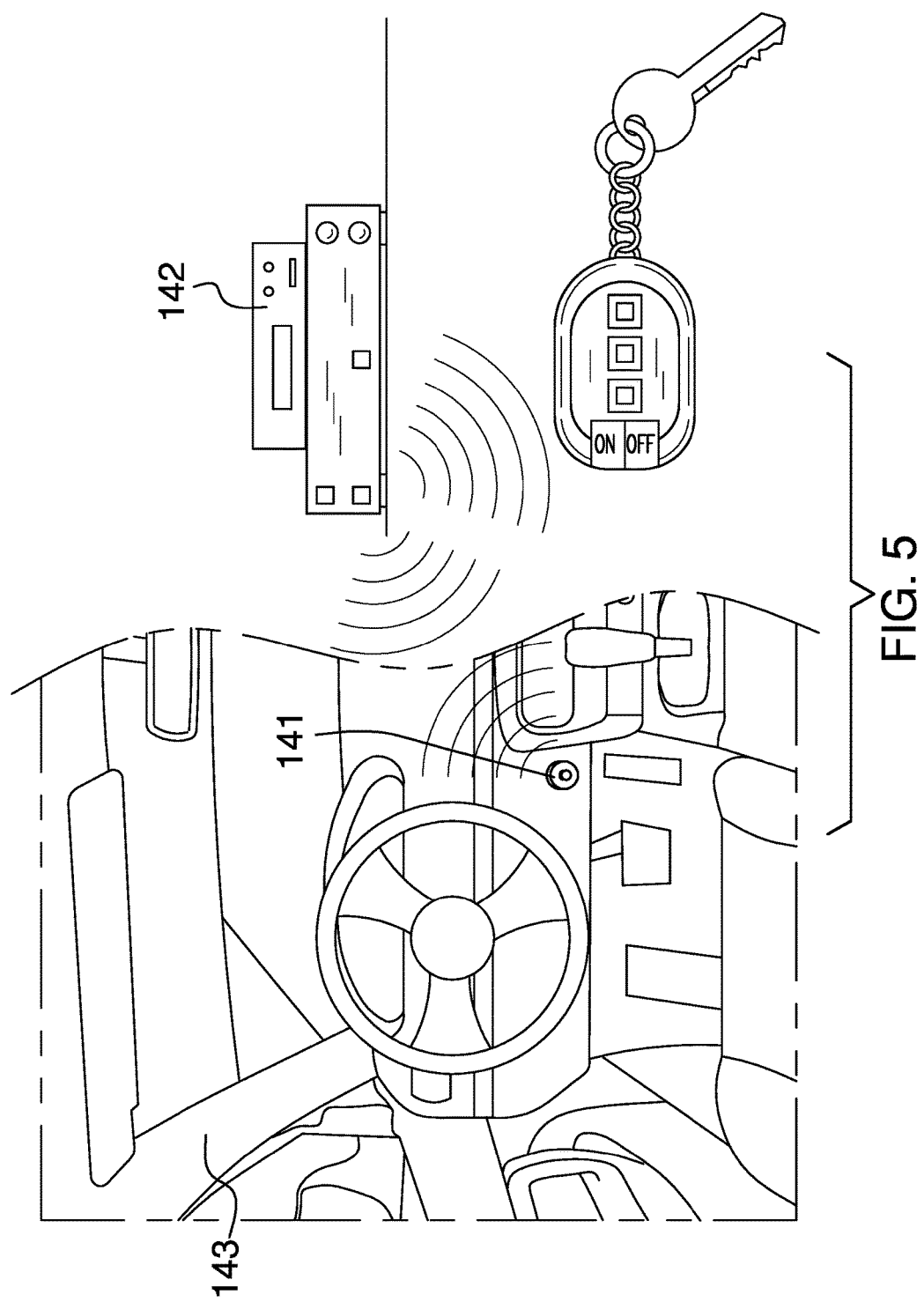

VEHICLE ALARM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicle, more specifically, a communication system adapted for use with a vehicle alarm.

SUMMARY OF INVENTION

The vehicle alarm communication module is a communication device that is adapted to work with and be integrated into a vehicle alarm system. The vehicle alarm communication module incorporates text-messaging capability into the vehicle alarm system. The vehicle alarm communication module is able to text changes in location of the vehicle to a station box that can be accessed through a television to allow users to see the location of their vehicle. In addition, the vehicle alarm communication module provides text to 911 capability, which allows the user to send a text message to participating emergency services organizations containing a distress message and the GPS location of the vehicle.

These together with additional objects, features and advantages of the vehicle alarm communication module will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle alarm communication module in detail, it is to be understood that the vehicle alarm communication module is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle alarm communication module.

It is therefore important that the claims be regarded as including such equivalent construction insofar as they do not depart from the spirit and scope of the vehicle alarm communication module. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is an in use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
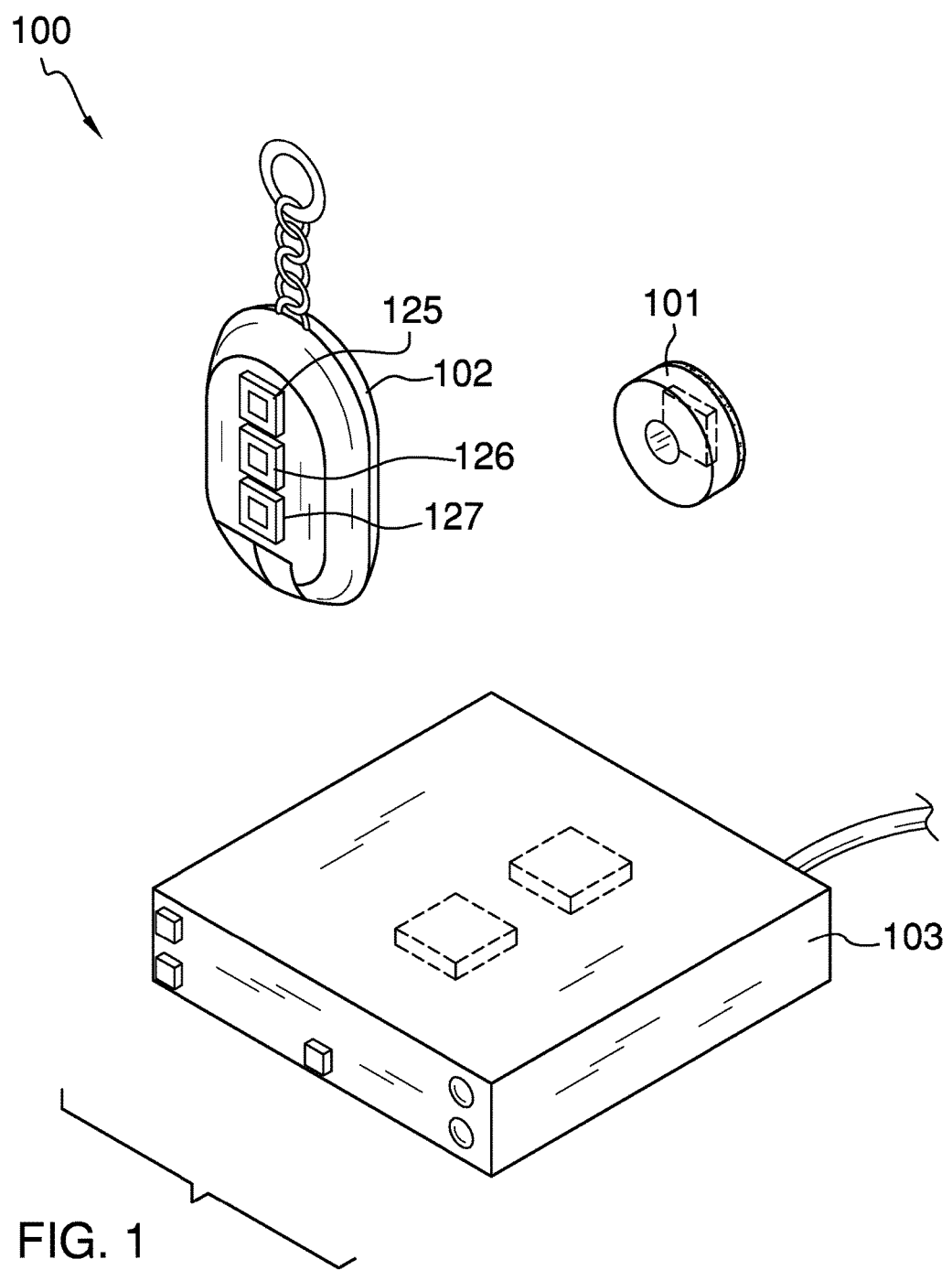
FIG. 1 is a perspective view of an embodiment of the disclosure.
Figure 2:
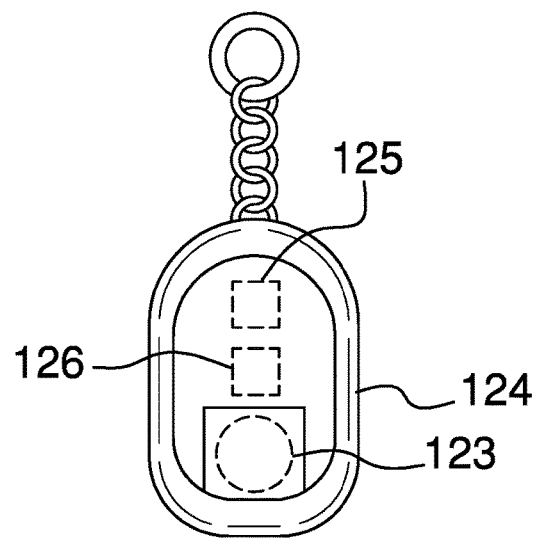
FIG. 2 is a back view of a detail of an embodiment of the disclosure.
Figure 3:
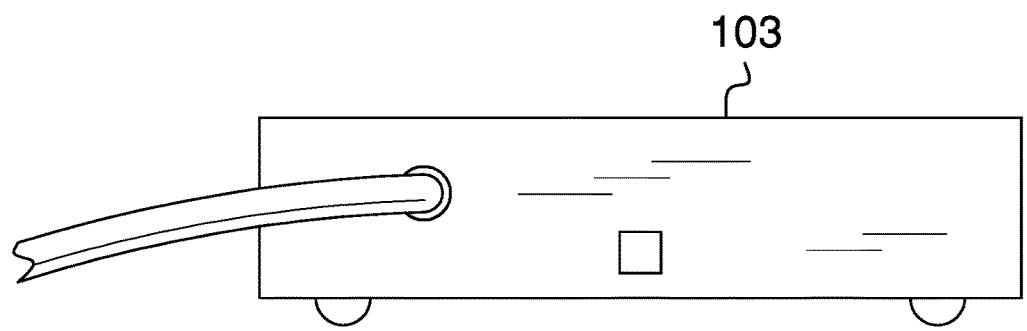
FIG. 3 is a back view of a detail of an embodiment of the disclosure.
Figure 4:
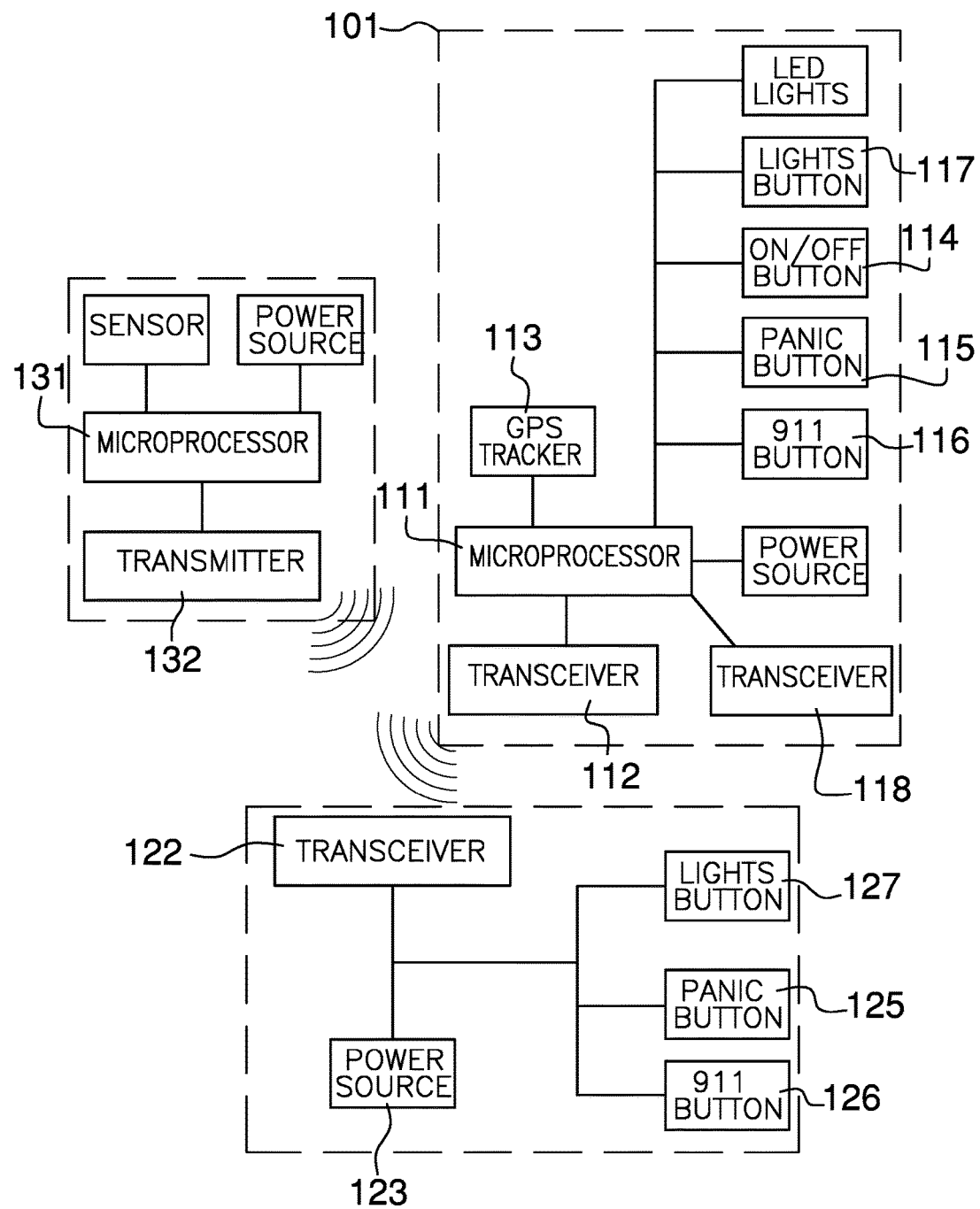
FIG. 4 is a block diagram of an embodiment of the disclosure.

Detailed reference will now be made to a first potential embodiment of the disclosure, which is illustrated in FIGS. 1 through 5.

The vehicle alarm communication module 100 (hereinafter invention) comprises a control box 101, a key fob 102, and a station box 103. The invention 100 is a communication device that is adapted to work with and be integrated into a vehicle alarm system 141. The invention 100 incorporates text-messaging capability into vehicle alarm system 141. Specifically, the invention 100 texts changes in location of the vehicle 143 to a video receiver box 142 that can be accessed through a television to allow users to see the location of their vehicle 143. In addition, the invention 100 provides text to 911 capability, which allows the user to send a text message to participating emergency services organizations containing a distress message and the GPS location of the vehicle 143.

The control box 101 adds the functionality described in the above paragraph to the vehicle alarm system 141 the control box 101 is adapted to work with. The control box 101 can be a stand-alone device that is added to an existing vehicle alarm system 141 or, alternatively, the functionality of the control box 101 can be integrated with existing vehicle alarm system 141 technology to form a single unit. The control box 101 further comprises a first logic module 111, a first transceiver 112, a GPS module 113, a power switch 114, a first panic switch 115, a first 911 switch 116, a first light switch 117, and a second transceiver 118. The first logic module 111 is a programmable device that is used to control and operate the control box 101. The first transceiver 112 is a commercially available SMS capable cellular device that is used to send text messages that are initiated by the first logic module 111 and to receive text messages that are acted on by the first logic module 111.

The GPS module 113 is an electronic device that uses the GPS to track the position of the vehicle 143 the control box 101 is installed in. When required, the first logic module 111 will query the GPS module 113 to download the GPS coordinates contained with the GPS module 113. The power switch 114 is a commercially available normally closed single pole single throw switch. The power switch 114 connects and disconnects electric power to the control box 101 and is in effect the on off switch for the control box 101. The first panic switch 115 is a normally open single pole single throw momentary switch. The first panic switch 115 is accessible from within the vehicle 143. When activated, the first panic switch 115 signals the first logic module 111 to initiate the audible alarm of the vehicle alarm system 141. The audible alarm will remain activated until the first panic switch 115 is pressed a second time.

The first 911 switch 116 is a commercially available normally open single pole single throw momentary switch that is accessible from within the vehicle 143. When activated, the first 911 switch 116 signals the first logic module 111 to initiate a text to 911 message to the local emergency services center that provides a preprogrammed distress message, the GPS coordinates of the vehicle 143 at the time the distress message was initiated, and contact information to allow the local emergency services center to query the control box 101 through the SMS system to receive updated GPS coordinate information.

The first light switch 117 is a commercially available normally closed single pole single throw switch that is accessible from within the vehicle 143. When opened, the first light switch 117 signals the first logic module 111 to disconnect all lights within the vehicle 143. The second transceiver 118 is the receiver portion of a readily and commercially available remote controlled switch and receiver kit that operates at various radio frequencies. The second transceiver 118 receives a signal transmitted by the key fob 102 and operates a plurality of remote controlled relays drawn from the readily and commercially available remote controlled switch and receiver kit. The opening and closing of these relays are used to signal the first logic module 111 to perform actions that are described elsewhere in this disclosure.

The key fob 102 is built from components from the drawn readily and commercially available remote controlled switch and receiver kit. The key fob 102 further comprises a third transceiver 122, a battery 123, a housing 124, a second panic switch 125, a second 911 switch 126, and a second light switch 127 all of which are provisioned through the readily and commercially available remote controlled switch and receiver kit. The third transceiver 122 is the transmitter portion of the key fob 102 and is used to send radio frequency signals that are received by the second transceiver 118. The housing 124 is the rigid casing that the components of the key fob 102 are contained within. The battery 123 is the power source that is used to operate the key fob 102. The second panic switch 125 is a switch that operates as a normally open single pole single throw momentary switch.

The second panic switch 125 is mounted such that it is accessible from the exterior of the housing 124. When activated, the second panic switch 125, through the third transceiver 122, the second transceiver 118 and the plurality of relays, to signal the first logic module 111 to initiate the audible alarm of the vehicle alarm system 141. The audible alarm will remain activated until the second panic switch 125 is pressed a second time.

The second 911 switch 126 is a switch that operates as a normally open single pole single throw momentary switch that is accessible from the exterior of the housing 124. When activated, the second 911 switch 126 signals the first logic module 111 to initiate a text to 911 message to the local emergency services center that provides a preprogrammed distress message, the GPS coordinates of the vehicle 143 at the time the distress message was initiated, and contact information to allow the local emergency services center to query the control box 101 through the SMS system to receive updated GPS coordinate information. The second light switch 127 signals the first logic module 111 to disconnect all lights within the vehicle 143.

The station box 103 is a box that is adapted for use with a video receiver box 142. The station box 103 further comprises a second logic module 131 and a fourth transceiver 132. The second logic module 131 is a programmable device that is used to control and operate the station box 103. The fourth transceiver 132 is a commercially available SMS capable cellular device that is used to receive text messages that are initiated by the first logic module 111 and to send text messages that will be acted on by the first logic module 111. Specifically, the first logic module 111 is programmed to send the GPS coordinates of the vehicle 143 to the station box 103 at regular intervals. The station box 103 stores this information and provides this information as a television signal input to the video receiver box 142 such that the information can be displayed on a television when desired. In addition, the station box 103 is programmed with the ability to send an SMS text to the control box 101 requesting GPS coordinates.

All the components discussed in this disclosure are readily and commercially available. In the first potential embodiment of this disclosure, the first logic module 111 and the second logic module 131 are readily and commercially available Arduino controllers. The first transceiver 112 and the fourth transceiver 132 are readily and commercially available SMS shields configured to work with Arduino controllers. The GPS module 113 is a readily and commercially available GPS shield configured to work with Arduino controllers. The readily and commercially available remote controlled switch and receiver kit is a four channel 433 MHz transmitter receiver and relay kit from Lilly Electronics. The remaining components discussed in this disclosure are commercially available.

The following definitions were used in this disclosure:

Battery: As used in this disclosure, a battery is a container consisting of one of more cells, in which chemical energy is converted into electricity and used as a source of power.

GPS: As used in this disclosure, depending on the context GPS refers to: 1) a system of navigational satellites that are used to determine the position and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System.

Housing: As used in this disclosure, a housing is a rigid casing that encloses and protects one or more devices.

LED: As used in this disclosure, an LED is an acronym for a light emitting diode. A light emitting diode is a 2 lead semiconductor that is also a light source.

Logic Module: As used in this disclosure, a logic module is a programmable device that accepts digital and analog inputs, processes the digital and analog inputs according to previously stored instruction and to provide the results of these instructions as digital or analog outputs.

Personal Data Device: As used in this disclosure, a personal data device is a handheld device that is used for managing personal information and communication. Examples of personal data device include, but are not limited to, cellular phones, tablets and smart phones.

Remote Control: As used in this disclosure, remote control means the establishment of the control of a device remotely generally through radioed instructions or coded signals.

Transceiver: As used in this disclosure, a transceiver is a device that is used to transmit and receive radio signals.

Vehicle: As used in this disclosure, a vehicle is a device that is used transporting carrying passengers, goods, or equipment that is powered by an internal combustion engine or an electric motor. This definition is specifically intended to include vehicles generally referred to all vehicles that travel over the road network including, but not limited to, automobiles, light trucks, vans and tractor trailers.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An alarm system comprising:
   a control box, a key fob, and a station box;
   wherein the alarm system is a communication device;
   wherein the alarm system is adapted to work with a vehicle;
   wherein the alarm system is adapted to work with a vehicle alarm system;
   wherein the alarm system is integrated into the vehicle alarm system;
   wherein the alarm system incorporates text messaging capability into vehicle alarm system;
   wherein the alarm system texts changes in location of the vehicle to a video receiver box;
   wherein the texts containing changes in the location of the vehicle can be accessed through a television;
   wherein the alarm system has text to 911 messaging capability;
   wherein the control box further comprises a first logic module, a first transceiver, a GPS module, a power switch, a first panic switch, a first 911 switch, a first light switch, and a second transceiver;
   wherein the first logic module is a programmable device that is used to control and operate the control box;
   wherein the first transceiver is an SMS capable cellular device;
   wherein the GPS module is an electronic device that uses the GPS to track the position of the vehicle the control box is installed in;
   wherein the first logic module queries the GPS module to download the GPS coordinates of the vehicle which are contained with the GPS module;
   wherein the first panic switch is a normally open single pole single throw momentary switch that is accessible from within the vehicle;
   wherein the first panic switch signals the first logic module to activate the audible alarm of the vehicle alarm system;
   wherein the first 911 switch is a normally open single pole single throw momentary switch that is accessible from within the vehicle;
   wherein the first 911 switch signals the first logic module to send a text to 911 message to a local emergency services center;
   wherein the text to 911 message contains the GPS coordinates of the vehicle at the time the text to 911 message was initiated;
   wherein the first light switch signals the first logic module to disconnect all lights within the vehicle;
   wherein the second transceiver receives radio signals transmitted by the key fob and operates a plurality of remote controlled relays that signal the first logic module to perform actions.

2. The alarm system according to claim 1 wherein the key fob further comprises a third transceiver, a battery, a housing, a second panic switch, a second 911 switch, and a second light.

3. The alarm system according to claim 2 wherein
   the second panic switch is a switch that operates as a normally open single pole single throw momentary switch;
   wherein the second panic switch is mounted such that it is accessible from the exterior of the housing.

4. The alarm system according to claim 3 wherein when activated, the second panic switch, through the third transceiver, the second transceiver and the plurality of relays, signals the first logic module to initiate the audible alarm of the vehicle alarm system.

5. The alarm system according to claim 4 wherein
   the second 911 switch is a switch that operates as a normally open single pole single throw momentary switch;
   wherein when the second 911 switch is mounted such that it is accessible from the exterior of the housing.

6. The alarm system according to claim 5 wherein
   activation of the second 911 switch signals the first logic module to send a text to 911 message to a local emergency services center,
   wherein activation of the second 911 switch to the first logic module is accomplished via the third transceiver, the second transceiver and the plurality of relays;
   wherein the text to 911 message contains the GPS coordinates of the vehicle at the time the text to 911 message was initiated.

7. The alarm system according to claim 6 wherein the second light switch, through the third transceiver, the second transceiver and the plurality of relays, signals the first logic module to disconnect all lights within the vehicle.

8. The alarm system according to claim 7 wherein the station box is adapted for use with a video receiver box;
   wherein the station box further comprises a second logic module and a fourth transceiver;
   wherein the second logic module is a programmable device that is used to control and operate the station box;

wherein the fourth transceiver is an SMS capable cellular device;

wherein the first logic module is programmed to send the GPS coordinates of the vehicle to the station box at regular intervals.

9. The alarm system according to claim 8 wherein the station box stores the GPS coordinates of the vehicle and provides this information as a television signal input to the video receiver box such that the information can be displayed on the television.

10. The alarm system according to claim 9 wherein the station box can send an SMS text to the control box requesting GPS coordinates of the vehicle.

\* \* \* \* \*